(12) United States Patent
Teshima

(10) Patent No.: US 9,535,636 B2
(45) Date of Patent: Jan. 3, 2017

(54) IMAGE FORMING APPARATUS AND IMAGE FORMATION METHOD THAT SUPPRESS TEMPERATURE OF FIXING DEVICE

(71) Applicant: KYOCERA Document Solutions Inc., Osaka (JP)

(72) Inventor: Kentaro Teshima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/696,006

(22) Filed: Apr. 24, 2015

(65) Prior Publication Data

US 2015/0309756 A1    Oct. 29, 2015

(30) Foreign Application Priority Data

Apr. 24, 2014   (JP) ................ 2014-090155

(51) Int. Cl.
| | |
|---|---|
| G06F 15/00 | (2006.01) |
| G06F 3/12 | (2006.01) |
| G06K 15/00 | (2006.01) |
| G03G 15/00 | (2006.01) |
| G06K 15/02 | (2006.01) |

(52) U.S. Cl.
CPC ............ G06F 3/1212 (2013.01); G03G 15/00 (2013.01); G06F 3/1221 (2013.01); G06F 3/1285 (2013.01); G06K 15/00 (2013.01); G06K 15/186 (2013.01); G06K 15/4045 (2013.01); Y02B 60/1271 (2013.01)

(58) Field of Classification Search
CPC .... G06F 3/1285; G06F 3/1221; G06F 3/1212; G06K 15/00
USPC ................................. 358/1.13–1.15
See application file for complete search history.

(56) References Cited

U.S. PATENT DOCUMENTS

| | | | | |
|---|---|---|---|---|
| 2012/0206752 | A1* | 8/2012 | Yoshizumi | ............ G06F 3/1221 358/1.13 |
| 2013/0135669 | A1* | 5/2013 | Ide | ........................ G06K 15/02 358/1.15 |

FOREIGN PATENT DOCUMENTS

JP    2013-242875 A    12/2013

* cited by examiner

*Primary Examiner* — Saeid Ebrahimi Dehkordy
(74) *Attorney, Agent, or Firm* — Hawaii Patent Services; Nathaniel K. Fedde; Kenton N. Fedde

(57) ABSTRACT

Provided is an image forming apparatus for shortening time to printout at time of receiving a print job in a sleep state when an image forming apparatus has an unmounting state of a storage device, such as HDD. A control part notifies printing preparation and a printing process to print engine based on a processing result of an analyzing part. At time of suppressing temperature of fixing device, if received data are analyzed and print data are generated, analyzing part sends a notice of first drawing object being generated to the control part. The control part confirms a connecting state of HDD in response to the notice. If HDD is in an unmounting state, the control part notifies the printing preparation to the print engine.

2 Claims, 2 Drawing Sheets

IMAGE FORMING APPARATUS AND IMAGE FORMATION METHOD THAT SUPPRESS TEMPERATURE OF FIXING DEVICE

INCORPORATION BY REFERENCE

This application is based on and claims the benefit of priority from Japanese Patent Application No. 2014-090155 filed on Apr. 24, 2014, the contents of which are hereby incorporated by reference.

BACKGROUND

The present disclosure relates to an image forming apparatus and an image formation method, and it is related, for example, the image forming apparatus having a function that suppresses temperature of a fixing device in a sleep mode (it is also called a "sleep function".).

An image forming apparatus, such as a printer or an MFF (Multifunctional Peripheral,) has a large power consumption in a fixing heater (it is also called a "fixing device".). Therefore, it has a configuration that lowers temperature of the fixing heater in the sleep mode or the like.

In a typical case, when it returns from a sleep mode, or the like, it performs not consuming electric power too much in temperature control to fixing temperature. Thereby, power consumption of the image forming apparatus is low as much as possible.

SUMMARY

An image forming apparatus of the present disclosure has function that suppresses temperature of a fixing device. An image forming apparatus includes an analyzing part and a control part. The analyzing part analyzes received data and generates print data. The control part notifies printing preparation and a printing process to a print engine based on a processing result by the analyzing part. The analyzing part, at time of the function that suppresses the temperature of the fixing device being performed, if the received data are analyzed and the print data are generated, when a first drawing object is generated, sends a notice of that effect to the control part. The control part confirms a connecting state of a storage device in response to the notice, and if the storage device is in an unmounting state, notifies the printing preparation to the print engine.

An image formation method of the present disclosure is an image formation method performed by an image forming apparatus having function that suppresses temperature of a fixing device. The received data and generate print data is analyzed. Printing preparation and a printing process to a print engine based on a processing result is notified. In the method, at time of the function that suppresses the temperature of the fixing device being performed, if the received data are analyzed and the print data are generated, when a first drawing object is generated, sends a notice of that effect. Also, in the method, a connecting state of a storage device is confirmed in response to the notice, and if the storage device is in an unmounting state, the printing preparation to the print engine is notified.

DETAILED DESCRIPTION

Hereinafter, an embodiment of the present disclosure is described with reference to drawings. The outline of the present embodiment is as follows. That is, in printer printing at time of a state where fixing temperature is low because of asleep state or the like, at timing earlier than a typical art, it performs a printing request to print engine. As a result, shortening of the time to start printing is realized. Also, useless power consumption is avoided by determining a configuration of devices. Hereinafter, it explains in detail.

Figure 1:
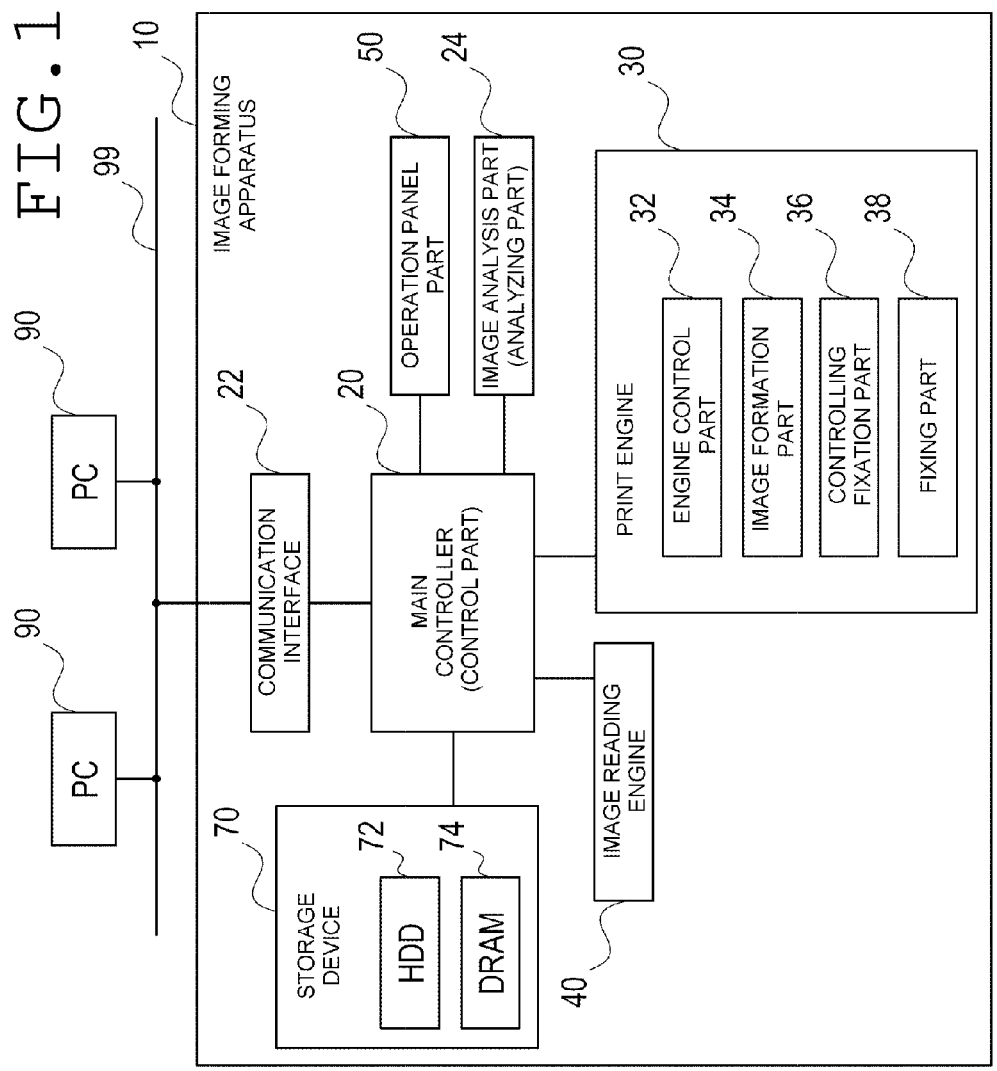
FIG. 1 is a functional block diagram related to the embodiment of the present disclosure illustrating a schematic structure of an image forming apparatus.

FIG. 1 is a functional block diagram illustrating schematic structure of image forming apparatus 10 related to the present embodiment, and, mainly, it is illustrated taking notice of function to return from a sleep state and to perform a printing process.

Image forming apparatus 10 is, for example, a printer or an MFP. Image forming apparatus 10 includes main controller 20, print engine 30, image reading engine 40, operation panel part 50, storage device 70, communication interface 22, and image analysis part 24.

Main controller 20 is configures with, for example, a CPU, a non-transitory recording medium, or the like. Main controller 20 controls each component of image forming apparatus 10, integrally.

Communication interface 22 is an interface based on a specific telecommunications standard. Communication interface 22 is connected with PC (Personal Computer) 90 via network 99.

Image analysis part 24 generates image data based on print data acquired from PC 90 via main controller 20. Also, image analysis part 24 analyzes image content of each generated page and determines the fixing temperature in print engine 30 (fixing part 38). In addition, image analysis part 24, in a case of a print job, normally, if generation of image data for first page is completed, via main controller 20, send a notice having a print job and the generated image data to print engine 30.

Also, as a function distinctive in the present embodiment, at time of sleep states, such as power saving mode, in a stage where a first image object is generated, which is before a stage where image data of the first page is completed, image analysis part 24 notifies that effect to main controller 20. Main controller 20, if HDD 72 is not attached, receives the notice and performs printing preparation process, that is, warming fixing part 38 of print engine 30, or the like.

Print engine 30 includes engine control part 32, image formation part 34, controlling fixation part 36, and fixing part 38 (fixing device).

Engine control part 32 entirely controls print engine 30, which includes image formation part 34, controlling fixation part 36, and fixing part 38.

Image formation part 34 is also called an interpreter and forms a toner image to fix on a paper based on image data. Controlling fixation part 36 monitors fixing temperature of fixing part 38 and controls it to a desired fixing state.

Fixing part 38 performs the heating press of the toner image formed of image formation part 34, and it fixes it to a paper. In addition, fixing part 38 is in low temperature in a sleep state, such as power saving mode, and it is in a state where fixing process cannot be performed, immediately. On the other hand, at a normal state, each component of print engine 30 is controlled as a state that can executes a print job, immediately, and fixing part 38 is warmed to a specific temperature to enable a print, which fixing process can be performed immediately.

Image reading engine 40 reads a manuscript set to a specific manuscript stand (not shown) and generates an image data of the manuscript.

Operation panel part 50 has various operation keys, such as a numeric keypad, a start key, a power key, and a touch panel. Operation panel part 50 accepts operation by a user and notifies it to main controller 20. Main controller 20 performs a process according to instructions.

Storage device 70 is a non-transitory recording medium. Storage device 70 has HDD 72 and DRAM 74. HDD 72 is a storage device that records and reads information by rotating a disk, which is applied magnetic substance, at high speed and moves a magnetic head. In addition, equipment of HDD 72 is an option, and thus it may not be equipped. Therefore, main controller 20 memorizes a mount state of HDD 72 as a specific setting state and grasps it. DRAM 74 is a kind of volatile memory and functions as workspace of various programs executed in main controller 20. In addition, other than HDD 72, a drive device, such as memory card or SSD (Solid State Drive,) may be used as a device that achieves a similar function. Also, in case of a specific condition, DRAM 74 functions as a temporary storing area (area of a RAM disk mode) and workspace for image data.

Figure 2:
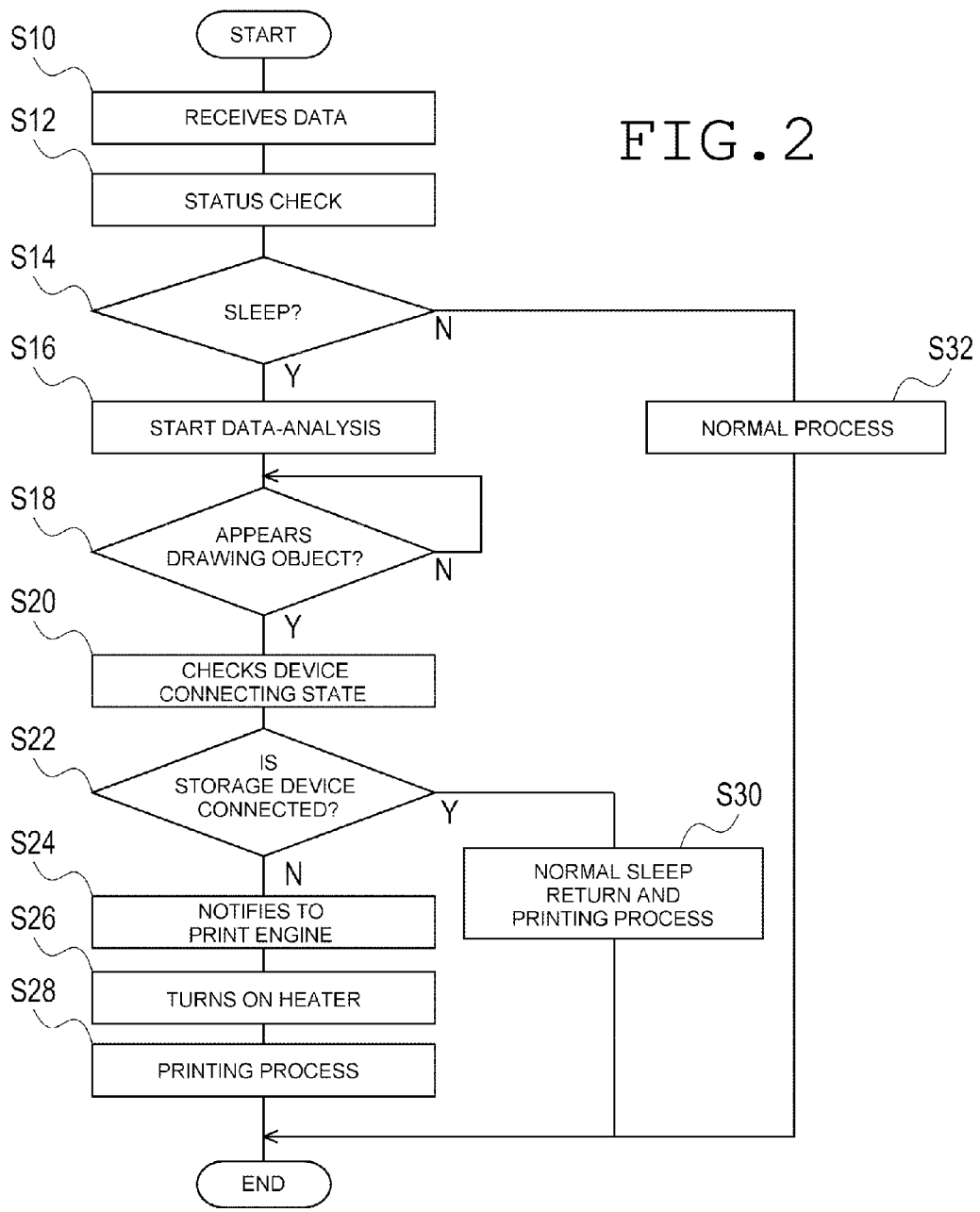
FIG. 2 is a flow chart related to the embodiment of the present disclosure illustrating a process when data is received from PC.

Operation of image forming apparatus 10 having the above configuration is explained with reference to a flow chart in FIG. 2. FIG. 2 is a flow chart that illustrates a process when data is received from PC. FIG. 2 is, especially, illustrates with taking notice of the process when it is in a sleep state by power saving mode.

Main controller 20 receives data (job data) from PC 90 via communication interface 22 and network 99 (S10). In that case, main controller 20 performs status check process that image forming apparatus 10 is a sleep state or is a normal state (S12).

If it is in the normal state instead of the sleep state ("N" of S14), main controller 20 performs a normal process (S32). That is, if the acquired job data are print jobs, it instructs to image analysis part 24 and print engine 30, and a printout process is performed. In this case, fixing part 38 is in a state where it can switch to fixing process, immediately. Therefore, if image data is generated by image analysis part 24, a printout is performed without stand-by-time to warm fixing part 38. If it is a storage job, the generated image data is stored in HDD 72. In addition, if HDD 72 is not equipped (or, if it is set to an unmounting state), it has only a print job (printout). However, a job is stored if a setup is accomplished that some areas of DRAM 74 function as a storage device as like a RAM disk mode even if HDD 72 is not equipped.

If it is in a sleep state ("Y" of S14), main controller 20 instructs image analysis part 24 to start a data-analysis process (S16). Image analysis part 24 performs data analysis and generation process of image data and determines whether a first drawing object appeared in the generated image data (S18). If the drawing object is not generated ("N" of S18), it continues the determination (S18).

If the drawing object is generated ("Y" of S18), image analysis part 24 notifies that effect to main controller 20. Main controller 20 that received the notice checks connecting state of a device (S20). That is, main controller 20 determines whether or not HDD 72 is in a mounting state.

If HDD 72 is in the mounting state ("Y" of S22), main controller 20 performs a process based on a normal sleep return process (S30). That is, each component of image forming apparatus 10 is proceeded to a normal state; if it is a print job, a printing process is performed; and if it is a storage job, storage process is performed.

If HDD 72 is in an unmounting state ("N" of S22), main controller 20 notifies an instruction of printing preparation to print engine 30 (S24). If engine control part 32 receives the notice of the instruction, it controls controlling fixation part 36 and turns on the heater of fixing part 38 (S26). That is, before acquiring the image data, a return process from the sleep state is started. Then, print engine 30 acquires the image data from image analysis part 24 via main controller 20 and performs the printing process (S28).

As mentioned above, according to the present embodiment, image analysis part 24 that is an interpreter performs data analysis, and in a stage where at least one image object is generated, it notifies to print engine 30. However, print engine 30 will be driven uselessly in case of a storage job. Thus, for a condition to perform such the process, it is confirmed whether or not equipping with a storage device (HDD 72) needed to perform a storage job. If it determines that the storage device is not attached, the notice of preparation to print engine 30 is instructed. As a result, in image forming apparatus 10 that is not equipped with the storage device, the time of completion to printout when there is a print job at the time of sleep can be shortened.

As explained in detail, in the printing process in a typical printer or MFP, a controller performs data reception. In that case, an image analysis part (interpreter) analyzes the data. The image analysis part notifies a printing request to an engine in a stage that a generation of the first page is completed. Here, it is also considered a case to start a process that performs to print by the printer at a time that temperature of a fixing device is low by a sleep state, or the like. Even in this case, it does not notify to the print engine until the first page is generated. Therefore, it needs time the preparation process of a printing start, which warms a fixing device, or the like. Accordingly, it needs a lot of time after data reception and start printing. The factor that such a process is required is, after acquiring print data, the job cannot be determined whether it is for printing or storing in a storage device until completing a generation of the first page. Therefore, measure technology is searched for.

In a typical case, the above situations are not estimated, and thus another technology is desired.

According to the present disclosure, in an image forming apparatus, in case of printing by a printer at a time of a state where fixing temperature is low because of a sleep state, or the like, a technology of shortening the time to a printing start under a specified condition after making a printing request can be provided.

In the above, the present disclosure is explained based on the embodiment. This embodiment is exemplification, and various modifications about combination of each of these components are possible. Such a modification is also in the range of the present disclosure are just to be understood by a person skilled in the art. For example, print engine 30 turned on the heater of fixing part 38, when the notice of printing preparation is received. However, it is not limited to it. As a process of a stage before that, it may only perform a starting process of image formation part 34, controlling fixation part 36, and fixing part 38 and waits after the process. The fixing temperature may be low depending on image data, or a temperature rise is early depending on characteristics of fixing part 38.

What is claimed is:

1. An image formation method performed by an image forming apparatus including a controller, a print engine, a fixing device, and a function that suppresses temperature of the fixing device in a sleep state, the method comprising:

memorizing a mount state of a HDD as a specific setting state;

receiving job data;

performing a status check process to determine whether the image forming apparatus is in the sleep state having the temperature of the fixing device suppressed or is in a normal state;

if the image forming apparatus is in the normal state, performing:
     i) a print process of generated image data, if the job data having been received is a print job, and
     ii) a storage process of the generated image data in the HDD, if the job data having been received is a storage job and the HDD is not in an unmounting state;

if the image forming apparatus is in the sleep state having the temperature of the fixing device suppressed, i) performing a data analysis and a generation process of image data, ii) determining whether a first drawing object appeared in the generated image data, and iii) if the first drawing object is appeared, sending to the controller a notice of the first drawing object having appeared in the generated image data, and determining whether or not the HDD is in a mounting state in response to the notice;

if the first drawing object is appeared and the HDD is in the mounting state and the image forming apparatus is in the sleep state having the temperature of the fixing device suppressed, i) transferring the image forming apparatus to the normal state, and ii) performing the print process or the storage process; and if the first drawing object is appeared and the HDD is in the unmounting state and the image forming apparatus is in the sleep state having the temperature of the fixing device suppressed, i) notifying an instruction of printing preparation to the print engine, ii) turning on a heater of the fixing device, and iii) performing the print process.

2. An image formation method according to claim 1, wherein equipment of the HDD is an option.

* * * * *